United States Patent
Kanki et al.

[11] Patent Number: 5,824,415
[45] Date of Patent: Oct. 20, 1998

[54] DECORATIVE MATERIAL

[75] Inventors: Masahiro Kanki; Masaki Tsukada; Tadamichi Ishii, all of Tokyo-To, Japan

[73] Assignee: Dai Nippon Printing Co., Ltd., Japan

[21] Appl. No.: 602,727

[22] PCT Filed: Jun. 20, 1995

[86] PCT No.: PCT/JP95/01217

§ 371 Date: Apr. 25, 1996

§ 102(e) Date: Apr. 25, 1996

[87] PCT Pub. No.: WO95/35210

PCT Pub. Date: Dec. 28, 1995

[30] Foreign Application Priority Data

Jun. 22, 1994 [JP] Japan ..................... 6-162931
Jun. 22, 1994 [JP] Japan ..................... 6-162932
Jun. 22, 1994 [JP] Japan ..................... 6-162933
Mar. 15, 1995 [JP] Japan ..................... 7-056321

[51] Int. Cl.[6] .................................... B32B 9/00
[52] U.S. Cl. ................. 428/411.1; 428/95; 428/159; 428/200; 428/202; 428/206; 428/207; 428/290; 428/172; 428/343; 428/542.2; 525/183; 525/419; 525/502; 156/244.11
[58] Field of Search .................. 428/200, 187, 428/202, 343, 347, 411.1, 206, 95, 207, 172, 483, 290, 195, 159, 542.2; 156/244.11; 525/502, 419, 183

[56] References Cited

U.S. PATENT DOCUMENTS 3,770,558 11/1973 Stahl .......................... 161/65
4,071,387 1/1978 Schlaepfer ................. 156/148
5,389,432 2/1995 Blanch et al. .............. 428/288
5,436,049 7/1995 Hu ............................. 428/85

FOREIGN PATENT DOCUMENTS 1-226325 9/1989 Japan .
3-24942 2/1991 Japan .
4-64441 2/1992 Japan .

*Primary Examiner*—Patrick Ryan
*Assistant Examiner*—Abraham Bahta
*Attorney, Agent, or Firm*—Parkhurst & Wendel, L.L.P.

[57] ABSTRACT

The present invention relates to a decorative material which is excellent in surface properties such as scratch resistance and soil resistance and, at the same time, environmentally friendly. The decorative material meludes: a substrate of a thermoplastic resin; and a resin layer 3 provided on one side of the substrate through a heat-sensitive adhesive layer 2, the resin layer being formed of a resin of a copolymer, of ethylene with an α,β-unsaturated carboxylic acid, which has been partially or completely neutralized with a metal ion.

9 Claims, 1 Drawing Sheet

DECORATIVE MATERIAL

BACKGROUND OF THE INVENTION

The present invention relates to decorative materials, such as floor coverings, and more particularly to decorative materials, having high properties, which can be used as an alternative to vinyl chloride resin floor coverings which causes environmental pollution.

A large number of floor coverings using a polyvinyl chloride film as a top film have hitherto been used in the art. The floor coverings using a polyvinyl chloride film as the top film, however, had the following drawbacks.

(1) The surface thereof has unsatisfactory abrasion resistance.

(2) Incineration results in the formation of a chlorine compound.

(3) Since the transparency and brilliance are unsatisfactory, the commercial value as the floor covering is still unsatisfactory.

(4) The soil resistance is so low that, once the surface is soiled, it is difficult to remove the soil.

In particular, the incineration of waste of the polyvinyl chloride film, which has hitherto been used as a decorative material, poses problems of corrosion of an incinerator by a hydrogen chloride gas and a chlorine gas evolved during the incineration and the evolution of a strongly acidic gas. Solving the above problems unfavorably incurs an increase in waste disposal cost.

In order to reduce the above problem, an attempt has been made to reduce the chlorine content of the decorative material by forming the surface layer of the printed decorative face through coating of a solvent-soluble resin varnish instead of the use of a transparent vinyl chloride film. The formation of the surface layer by coating of the solvent-soluble resin varnish is advantageous in that a surface protective coating can be formed simply by evaporating the solvent to dry the coating. The resultant decorative material, however, is unsatisfactory in surface properties such as surface hardness, gloss, abrasion resistance, and chemical resistance.

DISCLOSURE OF INVENTION

Accordingly, an object of the present invention is to provide a decorative material which is excellent in surface properties, such as scratch resistance and soil resistance, and, at the same time, environmentally friendly.

In order to attain the above object, the decorative material of the present invention comprises: a substrate of a thermoplastic resin; and a resin layer provided on one side of the substrate through a heat-sensitive adhesive layer, the resin layer comprising a copolymer of ethylene with an $\alpha,\beta$-unsaturated carboxylic acid, the copolymer being partially or completely neutralized with a metal ion.

In the present invention, a pattern layer and a backer may be suitably laminated according to the purposes.

The process for producing a decorative material according to the present invention comprises the steps of: forming a pattern layer on one side of the substrate and a heat-sensitive adhesive layer provided on the other side of the substrate; and putting a resin film formed of a resin of a copolymer, of ethylene with an $\alpha,\beta$-unsaturated carboxylic acid, which has been partially or completely neutralized with a metal ion, on the top of the laminated substrate in such a manner that the resin film faces the heat-sensitive adhesive layer, and bonding and integrating the resin film with the laminated substrate.

BEST MODE FOR CARRYING OUT THE INVENTION

Figure 1:
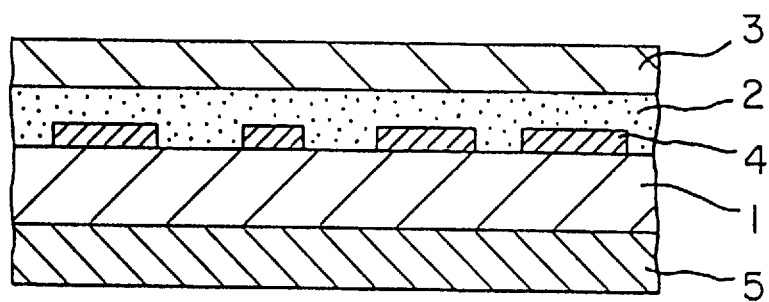
FIG. 1 is a cross-sectional view of an embodiment of the decorative material according to the present invention.

As shown in FIG. 1, the decorative material according to the present invention comprises: a substrate 1 of a thermoplastic resin; and a resin layer 3 provided on one side of the substrate through a heat-sensitive adhesive layer 2, the resin layer being formed of a resin of a copolymer, of ethylene with an $\alpha,\beta$-unsaturated carboxylic acid, which has been partially or completely neutralized with a metal ion.

Further, in the present invention, a pattern layer 4 and a backer layer 5 may be provided.

In the decorative material of the present invention, the resin layer 3 is formed of a resin film of a copolymer, of ethylene with an $\alpha,\beta$-unsaturated carboxylic acid, which has been partially or completely neutralized with a metal ion (such a resin being hereinafter referred to as an "ionomer."

Specific examples of the ionomer film include films based on polyolefins, such as polyethylene, polypropylene, and polybutylene. The film used in the present invention is one formed from a resin having such a structure that part of carboxyl groups are crosslinked with molecular chains of the polyolefin through a metal ion among the molecular chains.

The above ionomer film does not evolve any chlorine compound during combustion and, hence, is environmentally friendly. Preferably, the ionomer film can be laminated to and integrated with a plywood or other plastic sheets through an adhesive layer and has high transparency and, at the same time, excellent abrasion resistance, chemical resistance, and oil resistance.

Examples of the metal ion generally used for the neutralization include $Cu^{++}$, $Ag^+$, $Na^+$, and $Zn^{++}$. Among them, $Na^+$ and $Zn^{++}$ are preferred because they are excellent in chemical and physical properties such as oil resistance, soil resistance, ductility, strength, transparency, and abrasion resistance.

For example, SURLYN (trade name, Du Pont-Mitsui Polychemical Co., Ltd.), Himilan (trade name, Du Pont-Mitsui Polychemical Co., Ltd.) and the like may be used.

Acid moieties in the copolymer of an olefin with an $\alpha,\beta$-unsaturated carboxylic acid used in the present invention include acrylic acid and methacrylic acid. The copolymer is preferably such that the acid moiety is acrylic acid and the degree of ionization is 5 to 80%. When the degree of ionization is less than 5%, the film strength is likely to be lowered. On the other hand, a degree of ionization of more than 80% is unfavorable because working properties, such as hot pressing and embossing, are likely to be lowered.

A film of the ionomer can be formed by blow molding (an inflation process) using a circular die, melt extrusion using a T-die (a T-die process), or melt extrusion coating.

A sheet prepared by blow molding using a circular die utilizes air cooling, resulting in somewhat poor gloss and transparency. However, it is advantageous in that the sheet width is variable as desired.

For the melt extrusion molding using a T-die, since rapid cooling using a cooling roll is possible, it is possible to form a sheet having excellent gloss and transparency and, further, to impart a relief pattern layer to the sheet using a cooling roll having a surface appearance suitable for this purpose. This method, however, is disadvantageous in that the variability of the sheet width is limited.

The thickness of the ionomer film is preferably in the range of from 20 to 200 µm which causes no problems in treatments after the formation of the film, such as printing and embossing.

Preferably, the pattern layer may be provided on the ionomer film by a transfer process described below. In this case, if necessary, the ionomer film is preferably subjected to corona discharge treatment from the viewpoint of enhancing the bond strength between the ionomer film and other layer(s). In the corona discharge treatment, the application of a high voltage at a high frequency to a gap between an electrode directly connected to the high voltage and a metallic roll coated with a silicone results in the occurrence of a high-voltage corona. When the film is travelled through this place at a constant speed, it is reacted with ozone and nitrogen oxide to form a carbonyl group or the like, rendering the film hydrophilic. At the same time, the discharge creates a rough surface utilizing a numerous number of pores and, in addition, treats a monomeric substance present in the surface of the film to improve the adhesion of the ionomer film to a printing ink or the like, realizing high bonding strength.

The degree of the corona discharge treatment is preferably such that the surface tension of the treated surface is 46 to 50 dyn/cm. When the surface tension is more than 50 dyn/cm, there is a possibility that blocking occurs at the time of take-up procedure and arc discharge creates pinholes in the resin layer. When the surface tension is less than 46 dyn/cm, the adhesion of the printing ink to the film is unstable and, at the same time, no satisfactory adhesion to other substrate(s) after the formation of the film can be attained.

Incorporation of an antistatic agent into the ionomer film is preferred because the creation of static electricity by friction can be prevented when the decorative material is used as a floor covering. Antistatic agents usable herein include cationic surfactants, amphoteric surfactants, anionic surfactants, and nonionic surfactants, for example, organotin compounds.

The substrate of the decorative material according to the present invention comprises a thermoplastic resin sheet. In this case, preferred examples of the thermoplastic resin include polyolefins such as polyethylene, polypropylene, polybutylene, polymethylpentene, and ionomers; vinyl resins (except for polyvinyl chloride) such as polyvinyl acetate, polyvinyl alcohol, ethylene, and vinyl alcohol copolymer resins; polyester resins such as polyethylene terephthalate, ethylene terephthalate isophthalate copolymer, polybutylene terephthalate, and polycarbonate; styrene resins or styrene copolymers such as polystyrene, poly-α-methylstyrene, (meth)acrylate/styrene, acrylonitrile/styrene, and ABS (acrylonitrile/butadiene/styrene copolymer); acrylic resins such as polymethyl methacrylate, polyethyl methacrylate, polybutyl methacrylate, polymethyl acrylate, polyethyl acrylate, and polybutyl acrylate; polyamides such as nylon 6 and nylon 66; and other resins such as polyimides polyphenylene oxide, polysulfone, and vinyltoluene resin.

When the substrate is formed of a resin having a melting point above the melting point of the resin constituting the ionomer film of the present invention, the use of a resin having a melting point above 87° to 99° C., i.e., the melting point of the ionomer film, is preferred. Further, materials having excellent printability and transparent or colored sheets may be selected according to the purposes.

When the melting point of the resin constituting the substrate is below the melting point of the ionomer film, melt extrusion coating of a resin for the ionomer film in the formation of a film results in melt breaking or unfavorably provides a film having poor printability. Among the exemplified resins, polypropylene, medium-density polyethylene, polyester, polyamide and the like are particularly preferred for the substrate. They may be used as a stretched or unstretched film.

The provision of a pattern layer (a print layer), which is excellent as a design and, at the same time, has excellent hiding power, on at least one side of the substrate enables the pattern layer seen through a transparent film including an ionomer film to have an excellent print effect.

In the present invention, the ionomer film is bonded to and integrated with one side of the substrate through a heat-sensitive adhesive layer.

The heat-sensitive adhesive used in the present invention is an adhesive which can develop adhesive action upon heating. Examples thereof include petroleum resins and ketone resins known to soften upon heating. The term "heat-sensitive adhesive" used herein is intended to mean adhesives including a hot melt adhesive, that is, an adhesive which becomes liquid upon heating and, upon subsequent cooling to room temperature, is solidified to develop adhesive properties.

The use of the heat-sensitive adhesive in the decorative material of the present invention offers advantages including that high adhesion can be attained between the ionomer sheet as a top sheet and the thermoplastic resin sheet and that an adhesive layer, together with a pattern layer, can be previously formed on a thermoplastic resin sheet by continuous take-up procedure and stored in a roll form, making it possible to eliminate the step of applying an adhesive at the time of subsequent hot pressing for lamination and integration in a sheet form.

Specific examples of the heat-sensitive adhesive usable in the present invention include any thermoplastic resin having the above properties, and, among them, polyolefin resins (except for vinyl chloride resins causative of environmental pollution), such as polyethylene, ethylene copolymer resin, and ionomers are suitable.

A resin of a random copolymer of an olefin with methacrylic acid or an olefin with acrylic acid, wherein carboxyl groups present randomly in molecules are crosslinked among molecular chains through hydrogen bonding, is best suited as a heat-sensitive adhesive having high strength of bonding to the ionomer resin sheet and excellent suitability for coating by extrusion coating. Examples of such copolymer resins usable in the present invention include ethylene/methacrylic acid copolymer resin, propylene/methacrylic acid copolymer resin, butene/methacrylic acid copolymer resin, ethylene/methacrylic acid copolymer, propylene/acrylic acid copolymer, and butene/acrylic acid copolymer.

Among them, ethylene/methacrylic acid copolymer resin or ethylene/acrylic acid copolymer resin, of which the melting point is 90° to 100° C., is preferred.

The above heat-sensitive adhesive, even in the case of a decorative material including an ionomer film, can develop a good adhesive power of not less than 2 kg/inch of width in terms of peel strength, which is adhesive power specified in JIS-A5705 as necessary for practical use.

The ionomer film, when used as an alternative to a vinyl chloride film, has excellent surface properties and, further, is environmentally friendly. However, it, when used in a decorative material, has poor adhesion to other constituent layer (s) (a substrate or a pattern layer) and poor printability. Therefore, the ionomer film causes various problems when it as such is used as a decorative material.

In the present invention, the use of the above heat-sensitive adhesive for bonding between the ionomer film and other constituent layer(s) is preferred in order to eliminate the above problem.

In the present invention, the pattern layer may be formed by conventional printing. Alternatively, it may be formed by a transfer process.

For example, it may be formed by laminating a pattern layer and an adhesive layer in that order on a transfer substrate sheet to prepare a transfer sheet, heat-pressing the transfer sheet against an object so as for the adhesive layer to face the object, and peeling off the transfer substrate sheet.

The pattern layer may be formed by conventional printing. In the decorative material of the present invention, the pattern layer may be provided on any of the ionomer layer and the substrate.

Regarding the transfer substrate sheet used in the transfer sheet, a sheet having excellent printability such as will not cause melt breaking upon exposure to heat during the transfer is selected from materials usable in the conventional transfer sheets.

For example, a stretched or unstretched sheet of a polyester, a polyamide, polypropylene or the like and a laminate of this sheet and paper or a nonwoven fabric may be usable. The thickness of the substrate transfer sheet is preferably as small as 5 to 50 $\mu$m which causes no printing trouble because no uneven heating occurs at the time of transfer of the pattern layer, enabling the pattern layer to be uniformly adhered to the object.

The printing ink used in the pattern layer of the transfer sheet may be any ink so far as it has suitable releasability from the transfer substrate sheet. The releasability of the pattern layer is determined by the transfer substrate sheet and a spreading agent used in the ink. A suitable spreading agent may be selected from linear polyesters, polyvinyl butyral, ethyl cellulose, rosin derivatives, alkyl esters of polyacrylic acid, alkyl esters of polymethacrylic acid, vinyl chloride/vinyl acetate copolymer, chlorinated polyethylene, and chlorinated polypropylene. A resin free from chlorine is, of course, preferred from the viewpoint of the object of the present invention. Since, however, the spreading agent used in the pattern layer is very small, the use of a chlorine-containing resin does not substantially sacrifice the effect of the present invention.

The adhesive layer used in the transfer sheet is heat-bonded together with the material to be transferred, thereby transferring and bonding the pattern layer to the object and may be formed of a material selected from a linear polyester, acryl, polyurethane, vinyl chloride/vinyl acetate copolymer, chlorinated polyethylene, chlorinated polypropylene and the like. When the pattern layer is transferred to the ionomer layer, the use of the above heat-sensitive adhesive is preferred. As with the spreading agent, the adhesive layer is preferably formed of a resin free from chlorine.

In the present invention, for example, a backer is preferably laminated to the pattern layer optionally through a primer layer.

The backer is a material which serves to further increase the thickness of the surface protective layer of the pattern layer, thereby further enhancing the abrasion resistance of the pattern layer, in cooperation with the ionomer layer. It is a matter of course that the same effect can be attained by mere increase in thickness of the ionomer layer. Since, however, the abrasion resistance depends greatly upon the thickness of the surface layer, if the enhancement of the abrasion resistance is contemplated, it is preferred that the layer of an ionomer, which is a special material, have a minimum thickness necessary as the outermost layer with a general-purpose, low-cost resin layer being used for increasing the thickness to a value large enough to enhance the abrasion resistance.

Rubber, a polyolefin resin and the like are generally used as the backer. In the present invention, the use of a backer of an olefin resin, such as polyethylene, polypropylene, or polybutylene, is preferred.

Further, in the present invention, if necessary, an EC (melt extrusion coating) resin layer (not shown) may be provided between the resin layer 3 and the heat-sensitive adhesive layer 2.

When the EC resin layer is provided, the provision of an anchor coating layer is preferred in order to improve the bonding strength between the resin layer 3 and the EC resin layer. For example, an alkyl titanate anchor coating compound and a urethane anchor coating compound may be used for this purpose.

The EC and anchor coating may be carried out, for example, by coating an anchor coating compound on a substrate, drying the coating to remove the solvent, continuously conducting EC thereon, providing the heat-sensitive adhesive layer 2 and, if necessary, conducting aging treatment.

Further, in the present invention, if necessary, a primer layer may be provided from the viewpoint of improving the adhesion between layers. The primer layer may be formed of the same resin as used in the formation of the adhesive layer. For example, varnishes, such as polyester/isocyanate, polyether/isocyanate, acrylic resin, polyurethane, cellulose derivatives, and polyisocyanate, may be used alone or as a mixture of two or more.

In the present invention, the step of forming a pattern layer on one side of a substrate and forming a heat-sensitive adhesive layer on the other side of the substrate is carried out separately from the step of putting an ionomer film on the top of the above substrate so as for the ionomer film to face the heat-sensitive adhesive layer and bonding and integrating the two elements.

Further, in the present invention, the heat-sensitive adhesive layer is preferably formed by extrusion coating.

Further, in the present invention, it is also possible to carry out, as a single step, the step of bonding and integrating the ionomer film with the substrate and the step of laminating the backer. If necessary, the surface of the ionomer film may be embossed.

The present invention will now be described with reference to the following production examples, though it is not limited to the description of these examples.

EXAMPLE 1

A pattern layer was gravure-printed using a two-component curable polyurethane ink (trade name: ALFA, manufactured by Inctec Inc., Japan) on a surface, embossed in a matte form, of a 50 $\mu$m-thick ethylene/methacrylic acid random copolymer sheet (trade name: NUCREL, manufactured by Du Pont-Mitsui Polychemical Co., Ltd.). A chlorinated polypropylene resin liquid (trade name: LDK-TR, manufactured by Inctec Inc.) was then coated on the pattern layer to form a primer layer.

Thereafter, a 200 $\mu$m-thick backer of an olefin was put on the pattern layer side of the ethylene methacrylic acid copolymer sheet, and a 200 $\mu$m-thick ionomer film (trade name: Himilan, manufactured by Du Pont-Mitsui Polychemical Co., Ltd.) was put on the ethylene/methacrylic acid copolymer sheet in its side remote from the pattern layer. Hot pressing was then carried out under conditions of 140° C. and 5 kg/cm² for 10 min, thereby preparing a decorative material.

An abrasion resistance test specified in JIS-A5705 was carried out under conditions of abrasive paper S-42, truck wheel diameter 5 cm, load 1 kg, and 1000 revolutions. As a result, the abrasion loss was found to be 0.12 g. For comparison, the abrasion resistance test was carried out for a conventional decorative material having a polyvinyl chloride resin sheet as the surface sheet under the same conditions, and the abrasion loss was found to be 0.25 g, confirming that the decorative material of the present invention is superior in abrasion resistance to the conventional decorative material and free from any fracture such as caused by separation between layers.

EXAMPLE 2

A pattern layer was gravure-printed using a two-component curable polyurethane ink (trade name: ALFA, manufactured by Inctec Inc.) on one side of a 25 μm-thick polyethylene terephthalate film with an adhesive layer provided on both sides thereof (trade name: T-600WE, manufactured by Diafoil Co., Ltd.). A chlorinated polypropylene resin liquid (trade name: LOLK-TR, manufactured by Inctec Inc.) was then coated on the pattern layer to form a primer layer.

Thereafter, a two-component curable polyurethane resin liquid (trade name: Urethane Primer, manufactured by Dainichiseika Color & Chemicals Manufacturing. Co., Ltd.) was coated on the polyethylene terephthalate film in its side remote from the pattern layer to form a primer layer.

A 200 μm-thick backer of an olefin was put on the pattern layer side of the polyethylene terephthalate film, and a 200 μm-thick ionomer film (trade name: Himilan, manufactured by Du Pont-Mitsui Polychemical Co., Ltd.) was put on the primer layer. Hot pressing was then carried out under conditions of 140° C. and 5 kg/cm² for 10 min, thereby preparing a decorative material.

An abrasion resistance test specified in JIS-A5705 was carried out under conditions of abrasive paper S-42, truck wheel diameter 5 cm, load 1 kg, and 1000 revolutions. As a result, the abrasion loss was found to be 0.12 g. For comparison, the abrasion resistance test was carried out for a conventional decorative material having a polyvinyl chloride resin sheet as the surface sheet under the same conditions, and the abrasion loss was found to be 0.25 g, confirming that the decorative material of the present invention is superior in abrasion resistance to the conventional decorative material and free from any fracture such as caused by separation between layers.

EXAMPLE 3

A two-component curable polyurethane ink (trade name: ALFA, manufactured by The Inctec Inc.) was coated on one side of a 25 μm-thick polyethylene terephthalate film with an adhesive layer provided on both sides thereof (trade name: T-600WE, manufactured by Diafoil Co., Ltd.) to form a primer layer.

Then, an alkyl titanate anchor coating agent (trade name: B-1, manufactured by Nippon Soda Co., Ltd.) was coated on the polyethylene terephthalate film in its side remote from the pattern layer, and the coating was dried to remove the solvent. A 20 μm-thick ethylene/methacrylic acid random copolymer resin (trade name: NUCREL, manufactured by Du Pont-Mitsui Polychemical Co., Ltd.) layer was formed thereon by continuous extrusion coating.

Thereafter, a 200 μm-thick backer of an olefin was put on the pattern layer side of the polyethylene terephthalate film, and a 20 μm-thick ionomer film (trade name: Himilan, manufactured by Du Pont-Mitsui Polychemical Co., Ltd.) was put on the ethylene/methacrylic acid copolymer resin layer side. Hot pressing was then carried out under conditions of 140° C. and 5 kg/cm² for 10 min, thereby preparing a decorative material.

An abrasion resistance test specified in JIS-A5705 was carried out under conditions of abrasive paper S-42, truck wheel diameter 5 cm, load 1 kg, and 1000 revolutions. As a result, the abrasion loss was found to be 0.12 g. For comparison, the abrasion resistance test was carried out for a conventional decorative material having a polyvinyl chloride resin sheet as the surface sheet under the same conditions, and the abrasion loss was found to be 0.25 g, confirming that the decorative material of the present invention is superior in abrasion resistance to the conventional decorative material and free from any fracture such as caused by separation between layers.

EXAMPLE 4

A 50 μm-thick acrylic resin film (trade name: HBS006, manufactured by Mitsubishi Rayon Co., Ltd.) was used instead of the polyethylene terephthalate film used in Example 3, and a pattern layer was gravure-printed using a two-component curable polyurethane ink (trade name: ALFA, manufactured by Inctec Inc.) on one side of the acrylic resin film. Further, a chlorinated polypropylene resin liquid (trade name: LDK-TR, manufactured by The Inctec Inc.) was coated on the pattern layer to form a primer layer.

Thereafter, a two-component curable polyurethane anchor coating agent (trade name: Anchor Agent, manufactured by Showa Ink Ind. Co., Ltd.) was coated on the acrylic resin film in its side remote from the pattern layer, and the coating was dried to remove the solvent. A 20 μm-thick ethylene/methacrylic acid random copolymer resin (trade name: NUCREL, manufactured by Du Pont-Mitsui Polychemical Co., Ltd.) layer was formed thereon by continuous extrusion coating. Aging was carried out at 40° C. for one day, and the procedure of Example 3 was repeated to prepare a decorative material.

EXAMPLE 5

A decorative material was prepared in the same manner as in Example 3, except that a 50 μm-thick ethylene/vinyl alcohol copolymer resin film (trade name: Eval EF-E, manufactured by Kuraray Co., Ltd.) was used instead of the polyethylene terephthalate film.

EXAMPLE 6

A decorative material was prepared in the same manner as in Example 3, except that a 50 μm-thick moldable polyethylene terephthalate film (trade name: T-92, manufactured by Teijin Ltd.) was used instead of the polyethylene terephthalate film.

We claim:
1. A decorative material comprising:
   a substrate comprising a thermoplastic resin;
   a heat-sensitive adhesive layer formed on one side of said substrate, said heat-sensitive adhesive layer comprising a random copolymer of an olefin with methacrylic acid or a random copolymer of an olefin with acrylic acid, wherein carboxyl groups present randomly in molecules of the copolymer are crosslinked among the molecules through hydrogen bonding; and a resin layer provided on said substrate through said heat-sensitive adhesive layer, said resin layer being formed of a resin of a copolymer of ethylene with an αa,β-unsaturated carboxylic acid, which has been partially or completely neutralized with a metal ion.

2. The decorative material according to claim 1, further comprising a pattern layer.

3. The decorative material according to claim 1, further comprising a backer layer laminated thereon.

4. The decorative material according to claim 1, wherein said resin layer is formed of a resin of a copolymer of ethylene with acrylic acid or ethylene with methacrylic acid, which has been neutralized with a metal ion to a degree of ionization of 5 to 80%.

5. A process for producing a decorative material, comprising the steps of:

forming a pattern layer on one side of a substrate;

forming a heat-sensitive adhesive layer on the substrate to cover the pattern layer, the heat-sensitive adhesive layer comprising a random copolymer of an olefin with methacrylic acid or a random copolymer of an olefin with acrylic acid, wherein carboxyl groups present randomly in molecules of the copolymer are crosslinked among the molecules through hydrogen bonding;

forming a resin layer over the heat-sensitive adhesive layer, the resin layer being formed of a resin of a copolymer of ethylene with an α,β-unsaturated carboxylic acid, which has been partially or completely neutralized with a metal ion; and bonding and integrating the resin layer with the substrate, pattern layer and heat-sensitive adhesive layer to obtain the decorative material.

6. The process according to claim 5, wherein the heat-sensitive adhesive layer is provided by extrusion coating.

7. The process according to claim 5, further comprising the step of laminating a backer layer on the substrate remote from the pattern layer.

8. The process according to claim 5, wherein the resin layer is formed of a resin of a copolymer of ethylene with acrylic acid or ethylene with methacrylic acid, which has been neutralized with a metal ion to a degree of ionization of 5 to 80%.

9. The process according to claim 7, wherein the bonding of the resin layer and the lamination of the backer layer are carried out in a single step.

* * * * *